(12) United States Patent
Kim et al.

(10) Patent No.: US 8,663,750 B2
(45) Date of Patent: Mar. 4, 2014

(54) BACKLIGHT UNIT AND A METHOD OF FABRICATING THE SAME

(75) Inventors: Jigon Kim, Anyang-si (KR); Jeongmin Moon, Goyang-si (KR); Gibin Kim, Anyang-si (KR); Gilwon Han, Seoul (KR); Jigeun Nam, Seoul (KR); Chounsung Kang, Sacheon-si (KR)

(73) Assignee: LG Display Co. Ltd., Seoul (KR)

( * ) Notice: Subject to any disclaimer, the term of this patent is extended or adjusted under 35 U.S.C. 154(b) by 152 days.

(21) Appl. No.: 12/329,042

(22) Filed: Dec. 5, 2008

(65) Prior Publication Data
US 2009/0213570 A1    Aug. 27, 2009

(30) Foreign Application Priority Data

Feb. 22, 2008 (KR) .................. 10-2008-0016502

(51) Int. Cl.
*C08F 2/48* (2006.01)

(52) U.S. Cl.
USPC ........... 427/508; 427/162; 427/164; 427/278; 427/533; 362/97.1

(58) Field of Classification Search
USPC .......... 427/162, 164, 508, 533, 278; 362/97.1
See application file for complete search history.

(56) References Cited

U.S. PATENT DOCUMENTS

| | | | | |
|---|---|---|---|---|
| 2,138,645 | A * | 11/1938 | Rey | 209/555 |
| 4,125,760 | A * | 11/1978 | Nyfeler | 219/388 |
| 5,341,231 | A * | 8/1994 | Yamamoto et al. | 349/63 |
| 6,425,675 | B2 * | 7/2002 | Onishi et al. | 362/607 |
| 7,070,406 | B2 * | 7/2006 | Jeans | 425/174.4 |
| 2004/0219246 | A1 | 11/2004 | Jeans | |
| 2007/0204953 | A1 | 9/2007 | Lin | |
| 2009/0046362 | A1 * | 2/2009 | Guo et al. | 359/486 |

FOREIGN PATENT DOCUMENTS

| | | |
|---|---|---|
| CN | 1668440 A | 9/2005 |
| JP | 2002341322 A | 11/2002 |
| JP | 2005070744 A | 3/2005 |
| JP | 2007078711 A | 3/2007 |
| KR | 1020030055377 A | 7/2003 |
| KR | 1020060096198 A | 9/2006 |
| TW | 578013 B | 3/2004 |
| TW | I274654 B | 3/2007 |
| WO | WO 2007/111341 A1 | 10/2007 |
| WO | WO 2007111341 A1 * | 10/2007 |

OTHER PUBLICATIONS

Office Action issued in corresponding Taiwanese Patent Application No. 097148229, mailed Apr. 10, 2012.
Office Action issued in corresponding Korean Patent Application No. 10-2008-0016502, mailed Sep. 21, 2012.
Office Action issued in corresponding Chinese Patent Application No. 200810182352.8, mailed Feb. 16, 2012.
Office Action issued in corresponding Chinese Patent Application No. 200810182352.8, mailed Jan. 15, 2013.

* cited by examiner

*Primary Examiner* — Elena T Lightfoot
(74) *Attorney, Agent, or Firm* — Brinks Gilson & Lione

(57) ABSTRACT

A method of fabricating backlight unit is disclosed. The backlight unit method of fabricating backlight unit includes, preparing a base member having a predetermined thickness, applying ultraviolet curing resin on a surface of the base member, transferring prism patterns to the ultraviolet curing resin using a flexible mold having engraved patterns corresponding to the prism patterns, and curing the prism patterns before the prism patterns are separated from the engraved patterns of the flexible mold.

8 Claims, 4 Drawing Sheets

BACKLIGHT UNIT AND A METHOD OF FABRICATING THE SAME

RELATED APPLICATIONS

This application claims priority from Korean Patent Application No. 10-2008-016502, filed on Feb. 22, 2008, the contents of which are incorporated herein by reference in its entirety.

BACKGROUND

1. Field of the Invention

Exemplary embodiments of the invention relate to a method of fabricating a light guide plate and a backlight unit having the light guide plate, and more particularly, to a method of fabricating a light guide plate having a function of an optical sheet and a backlight having the light guide plate.

2. Description of the Related Art

Liquid crystal displays have been used in notebook personal computers, office automatic equipment, audio/video equipment, etc. because of advantages such as miniaturization, thin profile, and low power consumption.

The liquid crystal display includes a liquid crystal display module and a backlight unit. The backlight unit may be classified into an edge type backlight unit and a direct-under type backlight unit depending on a location of a light source.

The edge type backlight unit includes a light source unit, a light guide plate, a reflective plate, and an optical film.

The light source unit includes a light source such as at least one cold cathode fluorescent lamp (CCFL) and at lest one external electrode fluorescent lamp (EEFL), and a light source reflective plate on which the light source is positioned.

The light source produces light having a predetermined wavelength, for example, white light. The light source reflective plate reflects the light produced by the light source.

The light guide plate is positioned at one side of the light source unit so as to obtain uniform light. The light guide plate allows the light coming from the light source unit to travel toward the liquid crystal display module.

The light guide plate is made of a material having a critical angle of a predetermined value. The light guide plate is formed in a plate shape having an upper surface, a lower surface, and four sides.

Accordingly, in light passing through the side (i.e., an incident surface) of the light guide plate facing the light source unit, light having an azimuth angle smaller than the critical angle is emitted through the upper surface (i.e., an emitting surface) of the light guide plate, and light having an azimuth angle equal to or larger than the critical angle is totally reflected and diffused on the entire surface of the light guide plate.

The reflective plate is positioned on the lower surface of the light guide plate to reflect leakage light in an inside space of the light guide plate. The lower surface of the light guide plate may have a scattering pattern.

The optical film includes a diffuser sheet, a prism sheet, and a protective sheet. The diffuser sheet is positioned on the light guide plate and may include a lower diffuser sheet, a diffuser sheet support member, and an upper diffuser sheet.

The diffuser sheet diffuses light traveling through the light guide plate using beads distributed in the diffuser sheet.

The prism sheet is positioned on the diffuser sheet and includes a base film and prisms. The prism sheet focuses the light diffused by the diffuser sheet.

The protective sheet diffuses the light focused by the prism sheet to provide the diffused light to the liquid crystal display module.

In addition to the above-described configuration of the optical film, the optical film may use combinations of various sheets in order to diffuse and focus the light traveling through the light guide plate.

In the edge-type backlight unit, recent studies have been directed to decrease cost and make products thinner, for example, by removing the prism sheets and forming a prism pattern on the top surface of the light guide plate. But, in case that the light guide plate is formed by an injection molding method or a thermal press molding method according to a conventional guide light plate fabricating method, there are some problems. That is, it is difficult to make the light guide plate larger and obtain high yield because it is necessary to spend a long period for heating and cooling. Furthermore, there is a limit to enhancing an optical efficiency because it is impossible to form minute prism patterns due to a low pattern molding rate.

As related art directed to resolving the above-mentioned problems, Korean Patent laid-open publication No. 10-2007-0101951 discloses a method of fabricating a light guide plate which comprises patterning an ultraviolet curing resin using a roller having engraved patterns, and irradiating the patterned curing resin under ultraviolet ray to form a prism light guide plate.

It is only possible to produce the light guide plate having a thickness of blow 500 μm because a base member of the light guide is made of polyethylene terephthalate (PET). Accordingly, due to the thickness limitation of the base member, it is difficult to fabricate the light guide plate having a medium or large size.

Furthermore, it is difficult to form minute engraved patterns on a roller because the related art uses the roller made of a metal material. Although it is possible to form minute engraved patterns on the roller, another problem exist to deform the shape of the minute engraved patterns due to ultra violet ray which is used to cure the ultraviolet curing resin. Also, it is possible to generate faulty patterns because the patterned ultraviolet curing resin is maintained on the roller by an adhesive force between the ultraviolet curing resin and the roller.

BRIEF SUMMARY

Exemplary embodiment of the invention provide a method of fabricating a light guide plate having a function of an optical sheet and a size of medium or large to enhance productivity and light efficiency of the light guide.

Another exemplary embodiment of the invention provides a backlight having the light guide plate fabricated by the method of fabricating the light guide plate.

Additional features and advantages of the exemplary embodiments of the invention will be set forth in the description which follows, and in part will be apparent from the description, or may be learned by practice of the exemplary embodiments of the invention. The objectives and other advantages of the exemplary embodiments of the invention will be realized and attained by the structure particularly pointed out in the written description and claims hereof as well as the appended drawings.

In one aspect, a method of fabricating a light guide plate comprises, preparing a base member having a predetermined thickness, applying ultraviolet curing resin on a surface of the base member, transferring prism patterns to the ultraviolet curing resin using a flexible mold having engraved patterns corresponding to the prism patterns; and curing the prism patterns before the transferred prism patterns are separated from the engraved patterns of the flexible mold.

In another aspect, a backlight unit, comprises a light source unit for generating light, a light guide plate disposed at one side of the light source unit, wherein the light guide plate comprising a base member having a predetermined thickness, and a plurality of prism patterns formed on the base member and including ultraviolet curing resin, and a reflective plate disposed under the light guide.

It is to be understood that both the foregoing general description and the following detailed description are exemplary and explanatory and are intended to provide further explanation of embodiments of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE DRAWINGS AND THE PRESENTLY PREFERRED EMBODIMENTS

Figure 1:
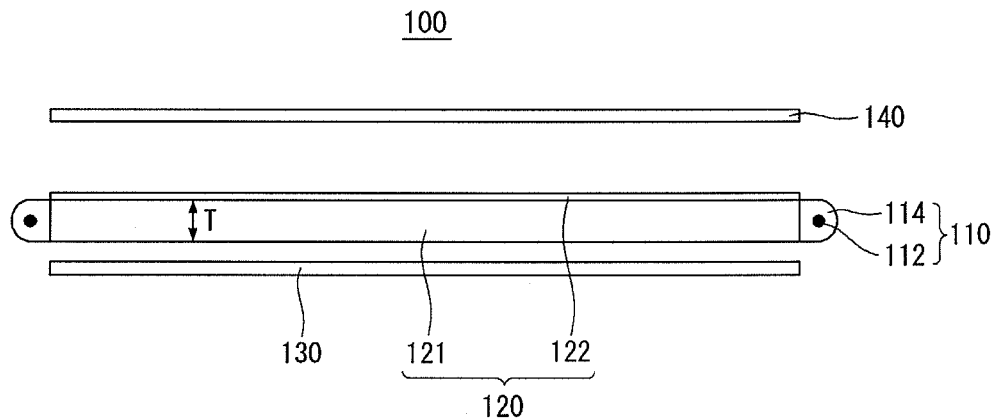
FIG. 1 is a view schematically showing a configuration of an edge type backlight unit according to a first exemplary embodiment of the invention.

Hereinafter, exemplary embodiments of the invention will be described in detail with reference to the accompanying drawings so that this disclosure is thorough and complete and fully conveys the concept of the invention to those skilled in the art. This invention may, however, be embodied in many different forms and should not be construed as being limited to the embodiments set forth herein.

In the drawings, the thickness of layers and regions are exaggerated for clarity. To facilitate understanding, identical reference numerals have been used, where possible, to designate identical elements that are common to the figures. It will also be understood that when a layer is referred to as being "on" another layer or substrate, it can be directly on the other layer or substrate or intervening layers may also be present.

A backlight unit according to a first exemplary embodiment of the invention will be described in detail with reference to FIGS. 1 to 4.

Figure 2:
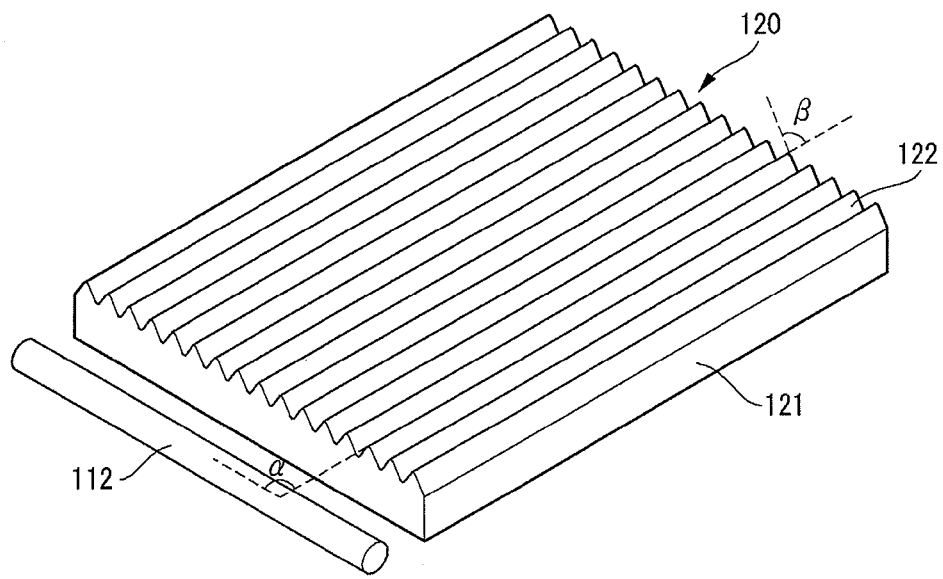
FIG. 2 is a prospective view of a light guide plate and a linear light source used in the backlight unit.

FIG. 1 is a view schematically showing a configuration of an edge Type backlight unit according to a first exemplary embodiment of the invention, and FIG. 2 is a prospective view of a light guide plate and a linear light source used in the backlight unit. FIGS. 3A to 3E are maps obtained by computer-simulating variations of brightness corresponding to a variety of angles between the light guide plate and the linear light source, and FIG. 4 is a graph illustrating light intensity according to a variation of vertical angles of prism patterns formed on the light guide shown in FIG. 2.

As shown in FIG. 1, the edge type backlight unit according to the exemplary embodiment includes a light source unit 110, a light guiding plate 120 at one side of the light source unit 110, a reflective plate 130 disposed under the light guide plate 120, and an optical sheet 140 disposed on the light guide plate 120 and comprising a diffusion sheet and so on.

The light source unit 110 includes a linear light source 112 producing light having a predetermined wavelength, for example, white light, and a light source reflective plate 114 reflecting the light produced by the linear light source 112. The linear light source 112 comprises a cold cathode fluorescent lamp (CCFL) or an external electrode fluorescent lamp (EEFL), as an example.

The light guiding plate 120 comprises a base member 121, which is disposed at one side of the light source unit 110 and functions as an optical incident surface, and a plurality of prism patterns 122, which functions as an optical emitting surface and has a shape of saw teeth.

The base member 121 may be made of polymethylmethacrylate (PMMA) or polystyrene (PS) having a thickness above 1 mm.

The prism patterns 122 may be made of ultraviolet curing resin comprising acryl resin such as urethane acrylate resin, epoxy acrylate resin or ester acrylate resin. The prism patterns 122 are disposed so that an angle α of each of the prism patterns 122 to the linear light source 112 may be maintained at about 80 degrees to 90 degrees as shown in FIG. 2.

Figure 3A:
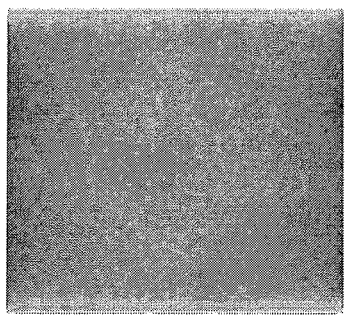
FIGS. 3A to 3E are maps obtained by computer-simulating variations of brightness corresponding to a variety of angles between the light guide plate and the linear light source.
Figure 3B:
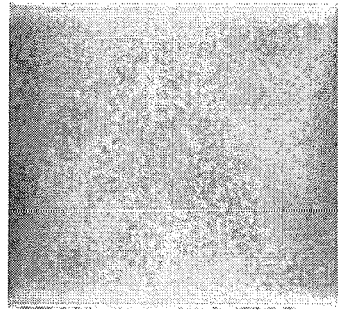
Figure 3C:
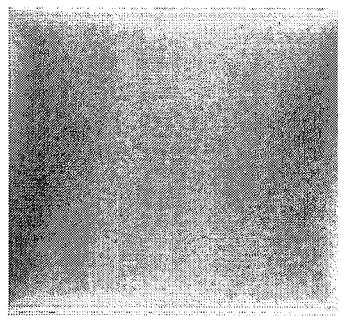
Figure 3D:
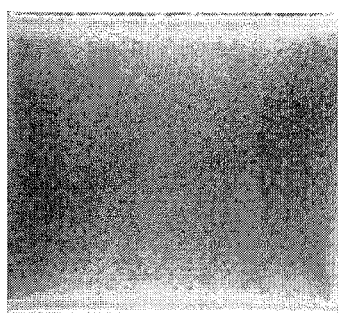
Figure 3E:
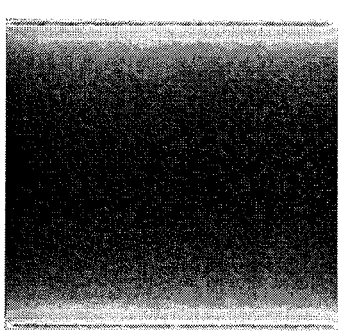
Figure 4:
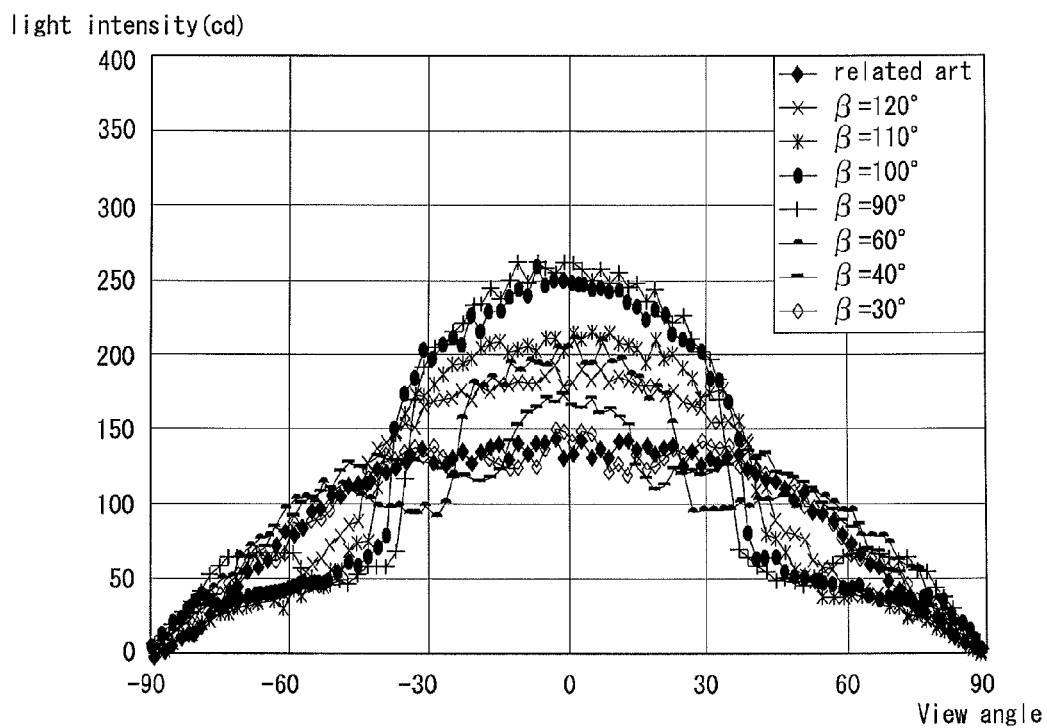
FIG. 4 is a graph illustrating light intensity according to a variation of vertical angles of prism patters formed on the light guide shown in FIG. 2.

FIGS. 3A to 3E are maps obtained by computer-simulating an evenness of brightness according to the angle α. More particularly, FIG. 3A shows the evenness of brightness when the angle α of the prism patterns 122 to the linear light source 112 are at 90 degrees, and FIG. 3B shows the evenness of brightness when the angle α of the prism patterns 122 to the linear light source 112 are at 80 degrees. FIGS. 3C and 3D show the evenness of brightness when the angle α of the prism patterns 122 to the linear light source 112 are at 60 degrees and 45 degrees, respectively. And FIG. 3E shows the evenness of brightness when the angle α of the prism patterns 122 to the linear light source 112 are at 0 degree.

Table 1 shows values of brightness according to a variation of the angle α of the prism patterns 122 to the linear light source 112.

TABLE 1

|  | α (degrees) | | | | |
|---|---|---|---|---|---|
|  | 0 | 45 | 60 | 80 | 90 |
| minimum brightness | 1191.83 | 1242.56 | 1365.32 | 1643.12 | 1672.09 |
| maximum brightness | 519.97 | 564.62 | 852.79 | 1325.67 | 1318.17 |
| evenness of of brightness | 2.29 | 2.2 | 1.6 | 1.24 | 1.27 |
| average brightness | 887.59 | 909.81 | 1086.76 | 1466.50 | 1492.84 |

As known from the table 1, FIG. 3A shows that average brightness is measured about 1492.84 nit and the evenness of the brightness is measured about 1.27, FIG. 3B shows that average brightness is measured about 1466.50 nit and the evenness of the brightness is measured about 1.27, FIG. 3C shows that average brightness is measured about 1086.76 nit and the evenness of the brightness is measured about 1.24, FIG. 3D shows that average brightness is measured about 909.81 nit and the evenness of the brightness is measured about 2.2, and FIG. 3E shows that average brightness is about 887.59 nit and evenness of the brightness is measured about 2.29. As known from the experimental result, the evenness of the brightness of FIG. 3E is much higher than that of FIGS. 3A and 3B. Herein, the evenness of the lightness is defined according to the following equation:

maximum value of the brightness in a screen/minimum value of the brightness in the screen Accordingly, it is preferred that the angle α of the prism patterns 122 to the linear light source 112 is formed between about 80 degrees and about 90 degrees.

On the other hand, the vertical angle β of each of the prism patterns is formed between about 90 degrees and about 110 degrees.

FIG. 4 is a graph illustrating a light intensity according to the vertical angle β of the prism patterns 122. Referring to FIG. 4, in case that the vertical angle β of the each prism pattern 122 is formed between about 90 degrees and about 110 degrees, the light intensity is more increased than other cases.

Accordingly, it is preferred that the vertical angles β of the prism patterns 122 is formed between about 100 degrees and about 110 degrees.

The light guide plate 120 having the prism patterns 122 may be used in a backlight unit which is applied to a medium or large liquid crystal display.

In general, in case of using polymethylmethacrylate (PMMA) or polystyrene (PS) as the base member of the light guide plate, it is known that the light guide plate having a thickness of 1 mm to 15 mm can be made. But, it is very difficult to form minute prism patterns on the base member using ultraviolet curing resin because ultraviolet curing resin has a very low adhesive force relative to polymethylmethacrylate (PMMA) or polystyrene (PS).

For this reason, for fabricating the light guide plate having a medium or large size, it is possible to form the minutes prism patterns made of ultraviolet curing resin on the base member only using polyethylene terephthalate (PET) having a thickness of below 500 μm. Accordingly, it is difficult to make the medium or large light guide plate having prism patterns formed on the emitting surface thereof.

Figure 5:
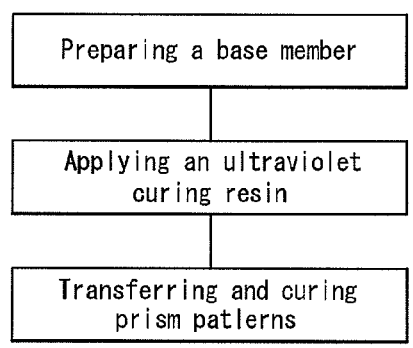
FIG. 5 is a flow chart of a method of fabricating the light guide plate.

FIG. 5 is a flow chart illustrating a method of fabricating the light guide plate according to an exemplary embodiment of this document. The method of fabricating the light guide plate comprises, preparing a base member, applying an ultraviolet curing resin to the base member, transferring a plurality of prism patterns on the ultraviolet curing resin using a flexible mold which is made of resin and has a plurality of engraved patterns corresponding to the plurality of prism patterns, and curing the prism patterns before the prism patterns are separated from the engraved patterns of the flexible mold.

In order to enhance an adhesive force of the ultraviolet curing resin to the base member, the method further may comprise, pre-processing the ultraviolet curing resin before the prism patterns are transferred to the ultraviolet curing resin.

The pre-processing the ultraviolet curing resin is to enhance the adhesive force between the prism patterns and the base member, and may includes plasma process or a chemical process. The plasma process is performed by passing the base member through an atmospheric plasma generating device for about 10 seconds to about 30 seconds. And, the chemical process is performed by etching a surface of the base member using an organic solvent. It is preferred to perform the plasma process because the chemical process needs more time than the plasma process to process the base member.

Figure 6:
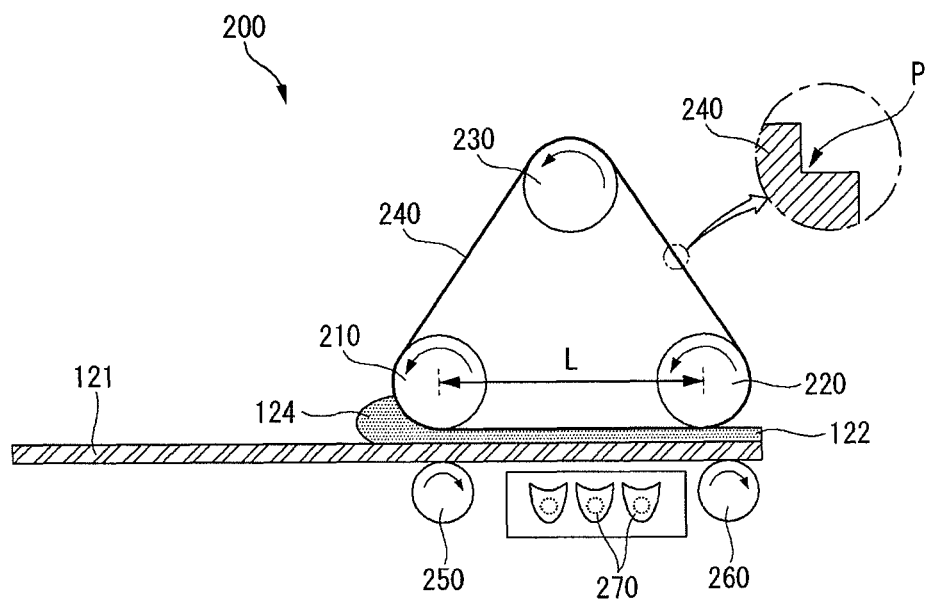
FIG. 6 is a view schematically showing one embodiment of a pattern forming device for fabricating the light guide plate according to the method of fabricating the light guide plate shown in FIG. 5.

FIG. 6 is a view schematically showing one embodiment of a pattern forming device for fabricating the light guide plate according to the method of fabricating the light guide plate shown in FIG. 5.

The pattern forming device 200 comprises a first supporting roll 210 and a second supporting roll 220 separated from the first supporting roll 210 at a predetermined distance L, a third supporting roll 230 disposed at an upper side between the first supporting roll 210 and the second supporting roll 220, a flexible mold 240 supported by the first to third rolls 201, 220 and 230, a first and second gap rolls 250 and 260 disposed under the first and second supporting rolls 210 and 220 to insert the base member 121 between the first and second supporting rolls 210 and 220 and the first and second gap rolls 250 and 260, an ultraviolet lamp 270 disposed between the gap rolls 250 and 260, and an applying device (omitted in the drawing) applying the ultraviolet curing resin 124 on the base member 121 at left side of the first supporting roll 210.

The flexible mold 240 is made of resin material which is not damaged by the ultraviolet from the ultraviolet lamp 270, and has engraved patterns P corresponding to the prism patterns 122.

The flexible mold 240 has a contact area corresponding to the predetermined distance L because the flexible mold 240 is supported by the first and second supporting rolls 210 and 220. The contact area refers an area to be contacted with the ultraviolet curing resin 124 applied on the base member 121.

The first to third supporting rolls 210, 220 and 230 are installed to control the predetermined distance L between the first and second supporting rolls 210 and 220. That is, the first and second supporting rolls 210 and 220 are installed to be moved to right side or left side, and the third roll 230 is installed to be moved to upward or downward.

The first and second gap rolls 250 and 260 disposed under the first and second supporting rolls 210 support the base member 121, and function to adjust a thickness of the prism patterns 12.

In fabricating the light guide plate 120 using the above-mentioned pattern forming device, the base member 121 is disposed at the space formed between the first and second supporting rolls 210 and 220 and the first and the second gap rolls 250 and 260.

The ultraviolet curing resin 124 is applied to the base member 121 at left side of the first supporting roll 210, and the base member 121 on which the ultraviolet curing resin 124 is applied is moved to right side by rotating the first to the third supporting rolls 210, 220 and 230 and the first and second gap rolls 250 and 260 at arrow directions, respectively.

When the flexible mold 240 is rotated in counter clockwise by the rotation of the first to third supporting rolls 210, 220 and 230, the ultraviolet curing resin applied to the light guide plate 120 is contacted with the flexible mold 240 under the first and second supporting roll 210 and 220, thus the engraved patterns P formed on the flexible mold 240 are transferred to the ultraviolet curing resin to form the prism patterns 122.

While the prism patterns 122 transferred to the base member 121 are moved at the predetermined distance L, the prism patterns 122 are cured by the ultraviolet radiated from the ultraviolet lamp 270 disposed between the gap rolls 250 and 260.

The predetermined distance L is determined at a distance which can be easily separated from the flexible mold 140. Also, the predetermined distance L may be controlled by changing positions of the first to third supporting rolls 210, 220 and 230.

Another ultraviolet lamp may be installed at right side of the second gap roll 260 to more certainly cure the prism patterns 122.

According to the pattern forming device having the above construction, the prism patterns are cured before the prism patterns are separated from the engraved patterns of the flexible mold. Therefore, it is possible to accurately form the prism patterns although the prism patterns have a minute shape.

Figure 7:
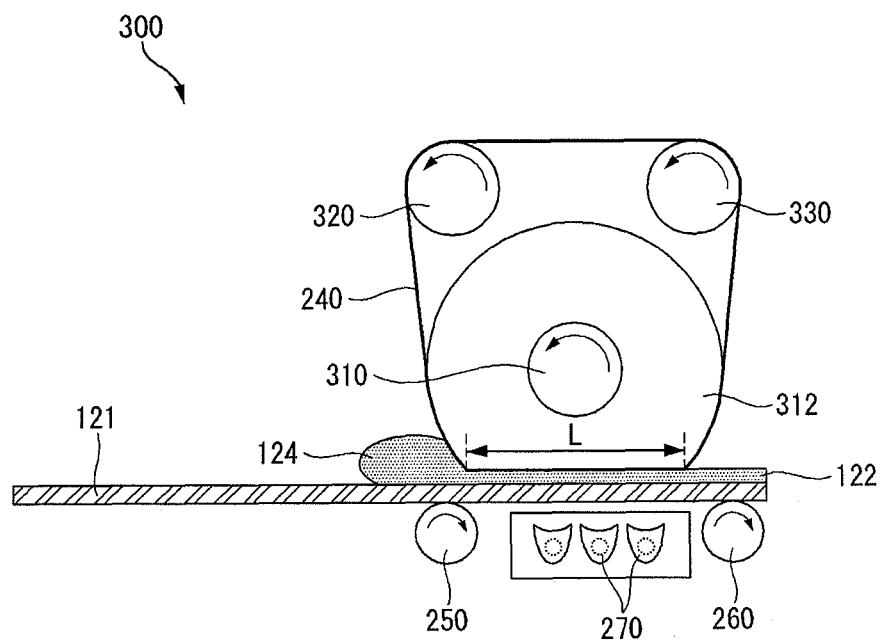
FIG. 7 is a view schematically showing another embodiment of a pattern forming device for fabricating the light guide plate according to the method of fabricating the light guide plate shown in FIG. 5.

FIG. 7 is a view schematically showing another embodiment of a pattern forming device for fabricating the light guide plate. The pattern forming device 300 comprises a fourth supporting roll 310 coated with an elastic member 312, a fifth supporting roll 320 separated from the fourth supporting roll 310, a sixth supporting roll 330 separated from the fourth and fifth supporting roll 310 and 320, a flexible mold 240 supported by the fourth to sixth supporting rolls 310, 320 and 330, a first and second gap rolls 250 and 260 disposed under the fourth supporting roll 310 to insert the base member 121 between the fourth supporting roll 210 and the first and second gap rolls 250 and 260, an ultraviolet lamp 270 disposed between the gap rolls 250 and 260, and an applying device (omitted in the drawing) applying the ultraviolet curing resin 124 to the base member 121 at left side of the fourth supporting roll 310.

The flexible mold 240 is supported by the fourth to sixth supporting rolls 310, 320 and 330. The fourth supporting roll 310 is installed to be contacted with the ultraviolet curing resin 124 so that the elastic member 312 formed on the fourth supporting roll 310 may have a contact distance L' which is a distance contacted with the ultraviolet curing resin 124.

The fourth to sixth supporting rolls 310, 320 and 330 are installed to control the distance L'. That is, the fourth supporting roll 310 is installed to be moved to upward or downward, and the fifth supporting roll 320 and the sixth supporting roll 330 are installed to be moved to upward or downward and/or right side or left side.

According to the pattern forming device of the second embodiment, it is possible to control the distance L' by changing an elastically deformed area of the elastic member 312 coated on the fourth supporting roll 310.

In fabricating the light guide plate using the above-mentioned pattern forming device, the ultraviolet curing resin 124 is applied to the base member 121 at left side of the fourth supporting roll 310, and the base member 121 on which the ultraviolet curing resin 124 is applied is moved to right side by rotating the fourth to sixth supporting rolls 310, 320 and 330 and the first and second gap rolls 250 and 260 at arrow directions, respectively.

When the flexible mold 240 is rotated in counter clockwise by the rotation of the fourth to sixth supporting rolls 310, 320 and 330, the ultraviolet curing resin 124 applied to the base member 121 is contacted with the flexible mold 240 under the elastic member 312 of the fourth supporting roll 310, thus the engraved patterns P formed on the flexible mold 240 are transferred to the ultraviolet curing resin 124 to form the prism patterns 122.

While the prism patterns 122 are moved at the distance L', the prism patterns 122 are cured by the ultraviolet radiated from the ultraviolet lamp 270.

Another ultraviolet lamp may be installed at right side of the fourth supporting roll 310 to more certainly cure the prism patterns 122.

In the method of fabricating the light guide plate having the above-described configuration, the minute prism patters may be formed on the base member comprising polymethylmethacrylate (PMMA) or polystyrene (PS) and having a thickness above 1 mm. Accordingly, it is possible to easily transfer the engraved patterns to the ultraviolet curing resin to form the prism patterns, and to effectively prevent the shape of the prism patterns from being deformed. Furthermore, it is possible to gain an excellent pattern shape because the prism patterns are separated from the flexible mold.

It will be apparent to those skilled in the art that various modifications and variations can be made in the embodiments of the invention without departing from the spirit or scope of the invention. Thus, it is intended that embodiments of the invention cover the modifications and variations of this invention provided they come within the scope of the appended claims and their equivalents.

The invention claimed is:

1. A method of fabricating a light guide plate, comprising:
disposing a non-flexible base member having a predetermined thickness between at least two gap rolls and a first supporting roll and a second supporting roll, disposing a third supporting roll above the first supporting roll and the second supporting roll such that the first, second and third rolls support a flexible mold, the at least two gap rolls and the first and second supporting rolls defining a gap therebetween, the non-flexible base member in direct contact with the gap rolls so that the first gap roll and the second gap roll directly drive the non-flexible base member;
applying an ultraviolet curing resin on one surface of the non-flexible base member at one side of the first support roll, wherein the non-flexible base member is fed into the gap with the non-flexible base member first passing through the first supporting roll and then moving to the second supporting roll at a predetermined distance between the first and second supporting rolls in parallel with the non-flexible base member, wherein the predetermined distance is determined and adjusted prior to the ultraviolet curing;
using the flexible mold having engraved patterns corresponding to the prism patterns to transfer prism patterns to the ultraviolet curing resin;
forming the prism patterns made from the ultraviolet curing resin on the non-flexible base member to form a light guide plate including the non-flexible base member and the prism patterns;
curing of the prism patterns before the prism patterns are separated from the engraved patterns of the flexible mold,
wherein the curing the prism patterns is performed by irradiating another surface of the non-flexible base member using ultraviolet radiated from an ultraviolet lamp disposed between the gap rolls,
wherein the prism patterns are formed on an optical emitting surface of the light guide plate and the prism patterns comprise shape of saw teeth, wherein a vertical angle of each saw tooth ranges from approximately 90 degrees to 110 degrees.

2. The method of claim 1, wherein the non-flexible base member is formed of one of polymethylmethacrylate (PMMA) and polystyrene (PS).

3. The method of claim 1, wherein the method further comprises, pre-processing the non-flexible base member to increase an adhesive force between the ultraviolet curing resin and the non-flexible base member.

4. The method of claim 1, wherein the pre-processing includes a plasma process.

5. The method of claim 1, wherein the pre-processing a chemical process.

6. The method of claim 4, wherein the plasma process comprises, passing the non-flexible base member through a plasma generating device for about 10 seconds to about 30 seconds.

7. The method of claim 1, wherein the first to third supporting rolls are installed so that the predetermined distance may be controlled.

8. The method of claim 1, wherein the gap rolls are disposed under the first and the second supporting rolls.

* * * * *